Jan. 21, 1930.  L. KNIEL  1,744,640
FLOATING ROOF FOR STORAGE TANKS
Filed Sept. 26, 1927

INVENTOR:
LUDWIG KNIEL,
By: Otto H. Ringer,
his Atty.

Patented Jan. 21, 1930

1,744,640

UNITED STATES PATENT OFFICE

LUDWIG KNIEL, OF WALNUT PARK, CALIFORNIA

FLOATING ROOF FOR STORAGE TANKS

Application filed September 26, 1927. Serial No. 222,072.

This invention relates to devices used for controlling liquids in storage-tanks.

One of the objects of this invention is to keep the heat or heat influences as far as possible away from the surface of stored liquids.

Another object is to provide a fully enclosed float to rest on the surface of stored liquids.

Another object is to provide ventilating means on such floats by which the lower or bottom side of the float is maintained as cool as possible.

Another object is to provide draining means for the float operative at any level of the float within a storage-tank.

Another object is to provide insulating means between the top surface and the lower portions of the float, whereby a transmitting of heat from the top to the bottom is eliminated or at least reduced.

Another object is to provide a yielding but comparatively firm and rigid seal between the outer edges of the float and the inside of a storage-tank.

Another object is to provide supporting blocks or stop blocks within a storage-tank for the float, to maintain the float above a certain point to assure a proper operating of the draining means.

Other objects will appear from the following description and appended claims as well as from the accompanying drawing, in which—

Figure 1:
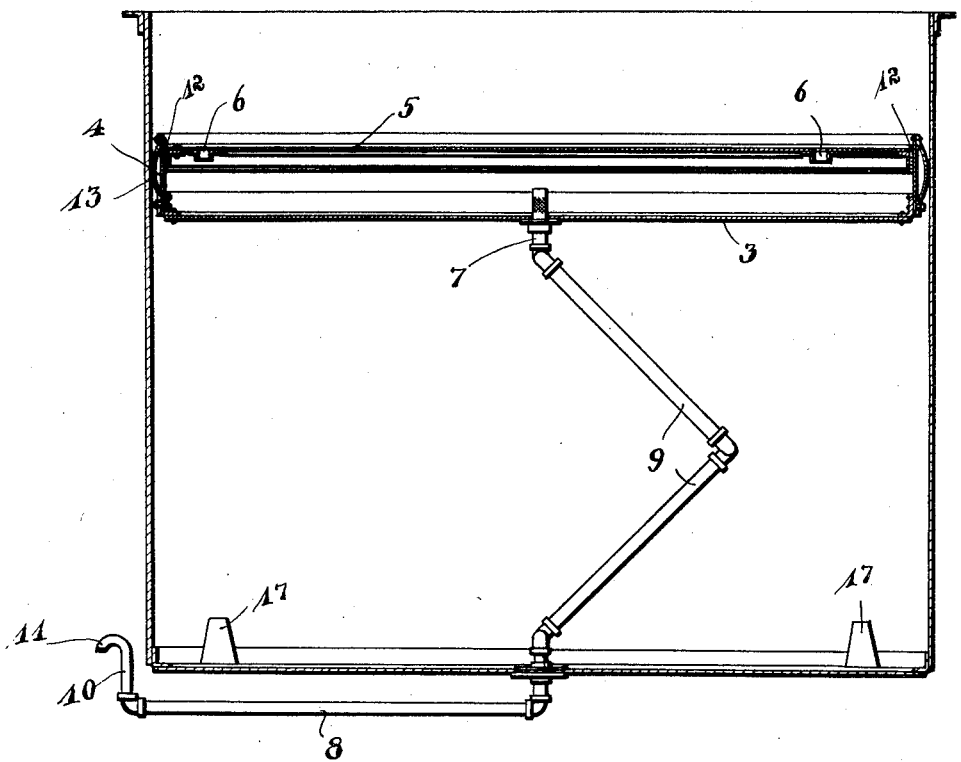
Fig. 1 is a fragmentary vertical cross section through a storage-tank with a float designed according to this invention.

Certain liquids, such as gasoline and benzine, are influenced by heat to eventually cause such liquids to ignite in storage-tanks by certain circulations of vapors, or other factors arising from the surface of the stored liquids when they are under the influence of the sun.

There is, furthermore, the danger of explosion in a storage-tank when adjoining tanks have been ignited.

Liquids stored in such tanks are further subject to a comparatively considerable evaporation.

To protect liquids in storage-tanks and to avoid the above named and other hazards and disadvantages, a float-roof is designed of fully enclosed form with an air space within, thereby insulating the top from the bottom and being, furthermore, designed to advantageously serve desirable purposes.

As illustrated in the drawing, the floating roof principally consists of a hollow tank-like structure embodying a bottom 3, circumferential sides 4, and a top 5. The top is provided with ventilating holes or apertures 6 whereby air may escape from the inside of the float.

To assure a positive circulation of cool air through the float or floating roof, a pipe connection 7 is provided in the bottom 3 of the float by which fresh air is supplied through the bottom to circulate through the float and to escape through the apertures 6 in the top of the float.

The bottom connection 7 is preferably connected to a bottom supply conduit 8 by yielding links 9. The vent 10 serves to admit air into the supply conduit 8, having a bent end 11 to prevent dirt or water to enter the air supply connections.

Since it is generally known that certain liquids, such as gasoline, are apt to seep or percolate through the best seam that can be made in a tank and inasmuch as it might be possible that liquids could accumulate within the floating tank, the circulating conduits and connections serve also to drain any accumulated liquids from the inside of the floating roof or float. The draining facilities serve also to carry off rain-water that may accumulate on the top or above this float.

Figure 2:
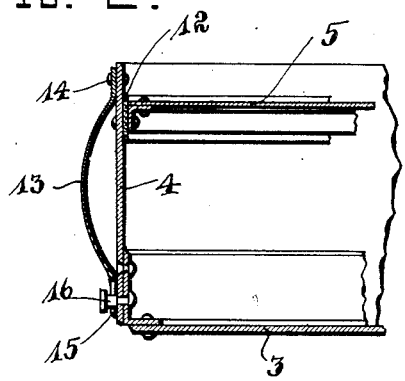
Fig. 2 is a fragmentary detail cross section through the float, illustrating the yielding capacity of the sealing means and the insulating means between the top and the other portions of the float.

Though the hollow float serves as the best means to insulate the top from the bottom and thereby to eliminate influences or heat effects on the surface of stored liquids by the sun, a further means for insulating the top from the bottom consists of a non-conducting strip 12 inserted between the top 5 and the sides 4 of the float as indicated in Fig. 2.

A sealing between the float or floating roof and the sides of the storage-tank is effected by comparatively light plates 13 of special shape, applied to the circumference of the float. These sealing plates are firmly connected to the float along one edge as indicated at 14, while the other edge of the plates is notched or slotted as indicated at 15 to allow a yielding and shifting of the plates 13 over and in relation to the bolts 16.

In the bottom of the storage-tanks, blocks are provided as indicated at 17, serving to support the float when the stored liquid comes to a level below a certain point. These supports or stops serve to maintain the conduit links 9 in a position to easily operate and, furthermore, maintain the float in a level to leave enough space between the bottom of the float and the bottom of the storage-tank to prevent any damaging of the bottom of the float or of the conduit links 9 by the movements of the float.

Having thus described my invention, I claim:

1. In a storage-tank, a float of a fully enclosed form with bottom, sides, and top-walls embodying an insulating air compartment with an air inlet means disposed to supply air from below into the said compartment and other means disposed to discharge air from the compartment upwardly.

2. In a storage-tank, a hollow float to rest on stored liquids having ventilating openings at points to be above the surface of liquids upon which the float rests, and a yielding conduit below the float having communication with the inside of the float and with the outside of the storage-tank in which the float is located.

3. In a storage-tank, a hollow float to rest on stored liquids having ventilating openings at points to be above the surface of liquids upon which the float rests, a yielding conduit below the float having communication with the inside of the float and with the outside of the storage-tank in which the float is located, and stops disposed below the float to support the float in a predetermined lowest position to protect said yielding conduits between the bottom of the float and the bottom of a storage-tank in which the float is located.

4. In a storage-tank, a hollow float to rest on stored liquids having ventilating openings at points to be above the surface of liquids upon which the float rests, a yielding conduit below the float having communication with the inside of the float and with the outside of the storage-tank in which the float is located, stops disposed below the float to support the float in a predetermined lowest position to protect said yielding conduits between the bottom of the float and the bottom of a storage-tank in which the float is located, the said yielding conduits being formed to serve also for draining the float.

5. In a storage-tank, a hollow float of comparatively smaller contours than the inside of a storage-tank in which the float is to be used, and a yielding sealing-strip with one edge secured to said float and the other edge provided with slots to slidingly engage over cooperating bolts to allow a yielding of the strip as it rides up and down within a tank in which the float is located.

6. In a storage-tank, a float comprising bottom, side, and top, and insulating means inserted between the top and the bottom to avoid a transmission of heat from the top to the bottom for protecting liquids upon which this float rests against influences by the sun.

In testimony that I claim the foregoing as my invention I have signed my name.

LUDWIG KNIEL.